(12) United States Patent
Preece et al.

(10) Patent No.: US 12,546,998 B2
(45) Date of Patent: Feb. 10, 2026

(54) DUAL-FUNCTION OPTIC FOR EYE DISPLAY AND CAMERA

(71) Applicant: The Government of the United States, as represented by the Secretary of the Army, Washington, DC (US)

(72) Inventors: Bradley L. Preece, Lorton, VA (US); John M. Hall, Stafford, VA (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 18/971,411

(22) Filed: Dec. 6, 2024

(65) Prior Publication Data

US 2025/0093649 A1 Mar. 20, 2025

Related U.S. Application Data

(62) Division of application No. 18/116,563, filed on Mar. 2, 2023, now Pat. No. 12,196,957.

(51) Int. Cl.
*G02B 27/01* (2006.01)
*G02B 27/10* (2006.01)
*G02B 27/30* (2006.01)

(52) U.S. Cl.
CPC ..... *G02B 27/0101* (2013.01); *G02B 27/0179* (2013.01); *G02B 27/1013* (2013.01); *G02B 27/30* (2013.01); *G02B 2027/0138* (2013.01); *G02B 2027/014* (2013.01)

(58) Field of Classification Search
CPC ........... G02B 27/0101; G02B 27/0179; G02B 27/1013; G02B 27/30; G02B 2027/0138; G02B 2027/014; G02B 27/0172
See application file for complete search history.

(56) References Cited

U.S. PATENT DOCUMENTS

| | | | |
|---|---|---|---|
| 5,694,628 A | 12/1997 | Nishitani | |
| 5,734,428 A | 3/1998 | Suda et al. | |
| 5,969,754 A * | 10/1999 | Zeman | G09B 21/008 348/136 |
| 6,120,461 A * | 9/2000 | Smyth | H04N 13/383 348/E13.047 |
| 7,586,686 B1 | 9/2009 | Hall | |
| 8,477,425 B2 | 7/2013 | Border et al. | |
| 10,901,221 B2 | 1/2021 | Gao et al. | |
| 10,963,103 B1 * | 3/2021 | Shahmohammadi | G02B 27/14 |
| 11,009,709 B2 * | 5/2021 | Guan | G02B 27/149 |
| 2006/0250322 A1 * | 11/2006 | Hall | G02B 27/0172 345/8 |

(Continued)

OTHER PUBLICATIONS

"Hot Mirrors" by Edmondoptics.com. Accessed Feb. 2, 2023. URL: https://www.edmundoptics.com/f/hot-mirrors/11665/.

(Continued)

*Primary Examiner* — Jeff Piziali
(74) *Attorney, Agent, or Firm* — Ronald Krosky

(57) ABSTRACT

For see-through AR displays, the current state of art uses geometric correction to lower the display location error, however this is far from an ideal solution and requires knowing range or pose of the devices. A dual-function optic for eye display & camera is disclosed, wherein a sensor camera imaging optics pipeline with a virtual projection point at an eye's retina reduces parallax errors to zero.

9 Claims, 2 Drawing Sheets

(56) References Cited

U.S. PATENT DOCUMENTS

| | | | | |
|---|---|---|---|---|
| 2013/0077049 A1* | 3/2013 | Bohn | ................. | G02B 27/0093 |
| | | | | 351/210 |
| 2016/0091722 A1* | 3/2016 | Liu | ........................ | H04N 23/56 |
| | | | | 345/8 |
| 2016/0223819 A1* | 8/2016 | Liu | ...................... | G02B 5/3083 |
| 2019/0222777 A1* | 7/2019 | Lovemelt | ............... | H04N 23/55 |
| 2023/0199279 A1* | 6/2023 | Kao | ....................... | H04N 23/11 |
| | | | | 348/48 |

OTHER PUBLICATIONS

"Cold Mirrors" by Edmondoptics.com. Accessed Feb. 2, 2023. URL: https://www.edmundoptics.com/f/cold-mirrors/12226/.

"Raspberry Pi Zero 2 W" by Raspberrypi.com. Accessed Feb. 2, 2023. URL: https://www.raspberrypi.com/products/raspberry-pi-zero-2-w/.

"Raspberry Pi Touch Display" by Raspberrypi.com. Accessed Feb. 2, 2023. URL: https://www.raspberrypi.com/products/raspberry-pi-touch-display/.

\* cited by examiner

DUAL-FUNCTION OPTIC FOR EYE DISPLAY AND CAMERA

REFERENCE TO RELATED APPLICATIONS

This is a divisional patent application of copending application Ser. No. 18/116,563 filed Mar. 2, 2023, entitled "Dual-Function Optic for Near-to-Eye Display and Camera." The aforementioned application is hereby incorporated herein by reference.

STATEMENT OF GOVERNMENT INTEREST

The invention described herein may be manufactured, used, sold, imported, and/or licensed by or for the Government of the United States of America.

FIELD OF THE INVENTION

This invention relates in general to optics, and more particularly, to a dual-function optic for near-to-eye display and camera.

BACKGROUND OF THE INVENTION

See-through displays are vital for Augmented Reality, where virtual objects and content can be displayed on top of the real world. One can also display complementary imagery onto the real world from another camera source. However, native see-through AR displays will show this imagery out of alignment, due to parallax and occlusions because the line-of-sight of the camera is not coincident with that of the observer's eye. This problem gets worse for both larger distances between the AR device and complementary camera and smaller viewing distances.

SUMMARY OF THE INVENTION

For see-through AR displays, the current state of art uses geometric correction to lower the display location error, however this is far from an ideal solution and requires knowing range or pose of the devices. It will also fail for complex environments, such as viewing clutter scenes or leaves on a tree, especially when up close or when there are many occlusions.

An exemplary embodiment of a dual-function optic for near-to-eye display & camera fixes these issues by adding a sensor camera imaging optics pipeline with a virtual projection point at the eye's retina, thereby reducing parallax errors to zero.

In one aspect, a dual-function optic of a bulk substrate material for near-to-eye display and camera is disclosed. An exemplary dual-function optic of a bulk substrate material comprises an entrance surface of a bulk substrate material having a convex curvature coated with a hot mirror coating disposed as an upper surface to receive display light rays, wherein said hot mirror coating transmits a visible spectrum of said display light rays as a transmitted light beam, but reflects an infrared spectrum; a 50% beamsplitter surface formed in the bulk substrate material at an angle of 45° to reflect roughly 50% of all wavelengths of light, including both visible and infrared, whereas light that is not reflected is transmitted as a further transmitted light; a bottom curved surface of the bulk substrate material coated with a cold mirror coating disposed at an opposite end of the entrance surface to receive said further transmitted light of said transmitted light beam, wherein the cold mirror coating transmits an infrared spectrum but reflects the visible spectrum such that the bottom curved surface behaves as a concave mirror to reflect the visible spectrum of said further transmitted light with positive optical power, resulting in a reflected light, wherein the resulting reflected light incident back on the 50% beamsplitter surface is deflected at a 90° angle, resulting in a deflected light; and an exit portal surface of the bulk substrate material coated with the hot mirror coating to receive and transmit the deflected light as a visible light, wherein said exit portal surface is disposed for human eye viewing of the visible light. Further, an exterior side surface of the bulk substrate material is disposed at an opposite end of the exit portal surface of the bulk substrate material and coated with a broad-spectrum anti-reflection coating that transmits both visible and infrared spectra of a real world image incident on the exterior side surface such that the real world image that is transmitted is also viewable through the exit portal surface for human eye viewing, and such that of the real world image reflected by the 50% beamsplitter surface, an infrared spectrum of the real world image is reflected by the upper surface, partially transmitted back through the 50% beamsplitter surface, and transmitted through the bottom curved surface to be focused onto an infrared camera pixel array.

In another aspect, a dual-function optical system is similarly disclosed for near-to-eye display and camera.

BRIEF DESCRIPTION OF DRAWINGS

Additional advantages and features will become apparent as the subject invention becomes better understood by reference to the following detailed description when considered in conjunction with the accompanying drawings wherein.

DETAILED DESCRIPTION

Figure 1:
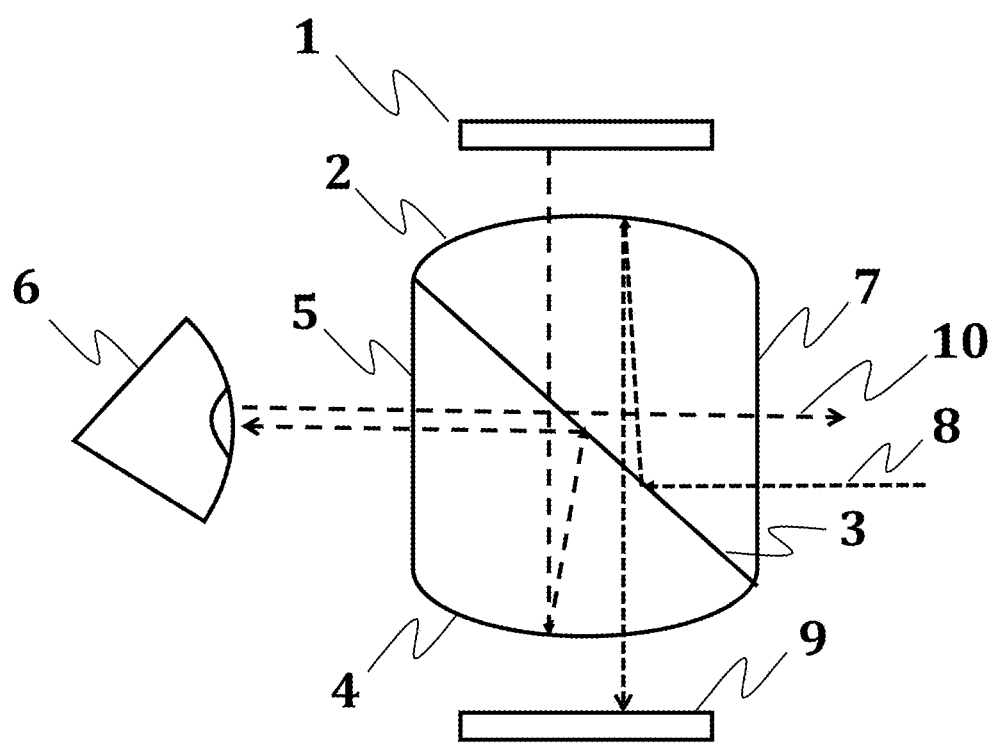
FIG. 1 shows optical functions of an exemplary dual-function optic.

A dual-function optic for near-to-eye display & camera is disclosed. The operational description of the invention's optical properties is best accomplished by referencing FIG. 1. The optical functions of the dual-function optic incorporate the cemented monolithic prism concept taught by U.S. Pat. No. 7,586,686 which provides a near-to-eye display capability, but for which the invention now has different optical surface requirements as explained herein. (U.S. Pat. No. 7,586,686 B1 to Hall is incorporated herein by reference.) Component 1 is a multi-pixel display screen which emits visible spectrum light from its surface. Examples of such components include devices offered by companies such as eMagin, Kopin, Sharp, Sony, LG, and many other vendors throughout the world. Light rays from the display screen 1 pass into the dual-function element's upper surface 2, which contains a "Hot Mirror" optical coating applied to the substrate material which is typically an optical plastic or glass as commonly known in the art. The "Hot Mirror" coating is represented by commercially available products such as offered by companies such as Edmund Optics or ThorLabs, and it has the properties of transmitting visible spectrum light, generally with wavelengths between 0.45 and 0.75 microns, while reflecting infrared spectrum light which generally includes wavelengths longer than 0.75 microns. The entrance surface 2 will have a convex curvature, and thus upon transmission and progression through the substrate material will induce positive optical power just as any convex lens. The bulk substrate material may be plastic or glass as explained in U.S. Pat. No. 7,586,686. The light beam will then pass through a 50% beamsplitter surface 3 which cuts through the dual-function optic at an angle of 45°. The beamsplitter function is typically achieved by a half-silvered coating which is well known in the art, which is cemented between two halves of the bulk material, and which reflects roughly 50% of all wavelengths of light, including both visible and infrared, while passing the remainder. The light then continues until it hits the bottom curved surface 4 which is coated with a "Cold Mirror" coating, which has the quality of reflecting the visible spectrum (0.45 to 0.75 microns) while transmitting the infrared spectrum (wavelengths greater than 0.75 microns). Since the incoming light from the display screen 1 is in the visible spectrum, the surface 4 behaves as a concave mirror which provides positive optical power. The radius of curvature for 4 is set such that the light beam coming from the display 1 will be collimated, i.e., projected to an infinite distance. The mirror reflection from 4 reverses the direction of the light beam, which then travels upwards and hits the 50% beamsplitter 3 once again. The reflected portion of the beam will them be deflected at a 90° angle which directs it toward the exit portal surface 5 which also possesses a "Hot Mirror" coating which transmits the visible light. The light beam them enters the pupil of the human eye 6. In this way, the image displayed by the screen 1 is thus projected into the human eye 6 which can also view the outside world directly via the beam path through surfaces 5, 3, and 7. Surface 7 is the exterior side of the optic which will possess a broad-spectrum anti-reflection coating that transmits both the visible and infrared spectra of light. In this way, the human eye 6 can view the image of the display screen 1 and light from the real world 10 at the same time. This function is known as "Augmented Reality". The dual-function optic simultaneously provides the camera image formation function for an infrared camera receiver pixel array 9. Infrared spectrum light from the external real-world 8 enters the optic through the outer surface 7 and the impinges upon the 50% beamsplitter surface 3. A portion of the incoming beam will be reflected upward at a 90° angle which directs it toward the "Hot Mirror" coated surface 2. The infrared light will be reflected by the concave surface 2, which this provides positive optical power. A portion of the reflected infrared light beam will then pass through the 50% beamsplitter and continue down to the lower surface 4 which has the "Cold Mirror" coating. The infrared beam will pass through surface 4, which because of its curvature will induce extra positive optical power. The light beam will then pass out of the dual-function optic to traverse a brief air gap and come to a focus into the infrared camera pixel array 9. In this way, the dual-function optic serves as the objective lens function for the infrared camera. The coincidence of the real world incoming light in the visible spectrum 10 which goes directly to the human eye 6 without any induced optical power, and the infrared spectrum light 8 which is imaged onto to the infrared camera pixel array 9, results in a situation where there is zero parallax error between the two. Correction of any misalignments among the optical components can then be handled electronically as explained in the next FIG. 2.

Figure 2:
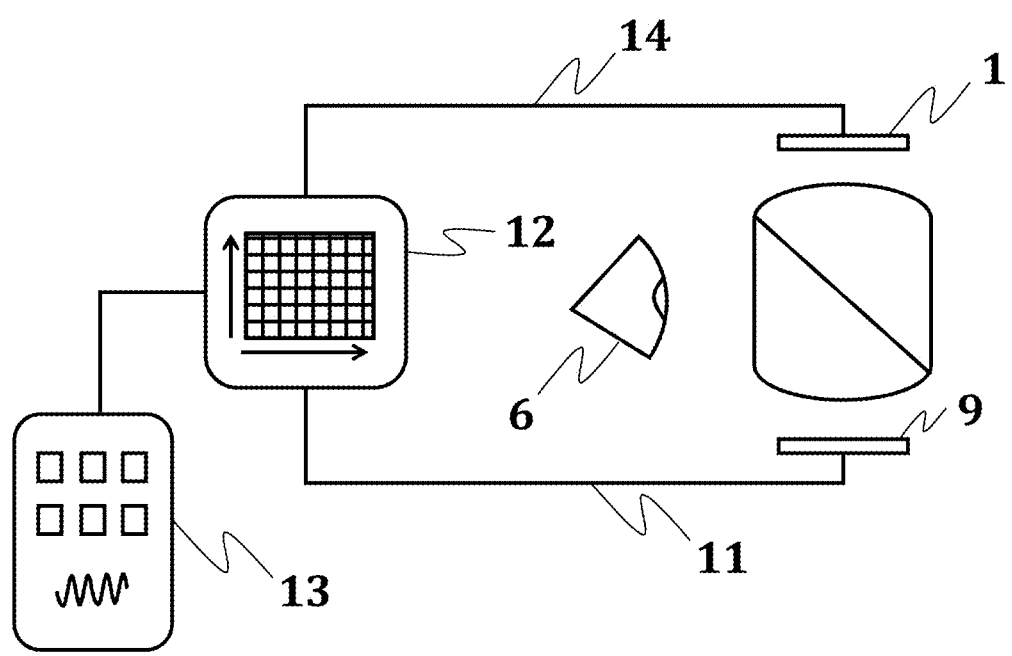
FIG. 2 shows an operational diagram of an electronic processing system based on the exemplary dual-function optic.

The operation of the invention's electronic processing functions is best explained via inspection of FIG. 2. The image of the scene is captured by the camera receiver pixel array 9 which converts the optical signal into an electrical video signal. A connecting cable 11 relays this signal to a digital signal processor 12 which arranges a mathematical matrix of the pixel values. The processor device 12 can be any of a myriad of commercially available units, including for example the Raspberry Pi Zero 2W®. Optional image processing techniques commonly known in the art can also be employed in 12, such as image rotation, inversion, and distortion correction as desired. The processor 12 furthermore provides a control interface 13 whereby the user may shift the pixel positions at a minimum in the vertical and horizontal directions. Multiple devices are suitable for the control interface 13 as commonly known in the art, and which may include button pads, joystick controllers, cell-phone touch-screens, USB laptop interfaces, etc. For example, the commercially available Raspberry Pi Touch Display® is a touch screen which is representative of the control device 13. The processed electronic image is then transported to the display 1 via another connecting cable 14. The processing function described in FIG. 2 thus enables the device operator to manually fine-tune the alignment of the scene image from the camera receiver pixel array 9 to that which is seen directly by the human eye 6 is properly overlapped with no parallax.

The following commercial item sources are variously incorporated by reference, and as separately listed below:
 a) Hot Mirror: https://www.edmundoptics.com/f/hot-mirrors/11665/
   Reflects>90% of the NIR and IR Light; and
   Transmits>85% of Visible Light.
 b) Cold Mirror: https://www.edmundoptics.com/f/cold-mirrors/12226/
   Reflects 90% of Visible Light; and
   Transmits 80% of the NIR and IR Light.
 c) Raspberry Pi Zero 2W® processor:
   https://www.raspberrypi.com/products/raspberry-pi-zero-2-w/
 d) Raspberry Pi touch Display®:
   https://www.raspberrypi.com/products/raspberry-pi-touch-display/

It is obvious that many modifications and variations of the present invention are possible in light of the above teachings. It is therefore to be understood that within the scope of the appended claims, the invention may be practiced otherwise than as described.

What is claimed is:

1. A dual-function optic of a bulk substrate material for near-to-eye display and camera, comprising:
   an entrance surface of a bulk substrate material having a convex curvature coated with a hot mirror coating disposed as an upper surface to receive display light rays, wherein said hot mirror coating transmits a visible spectrum of said display light rays as a transmitted light beam, but reflects an infrared spectrum;
   a 50% beamsplitter surface formed in the bulk substrate material at an angle of 45° to reflect roughly 50% of all wavelengths of light, including both visible and infrared, whereas light that is not reflected is transmitted as a further transmitted light;
   a bottom curved surface of the bulk substrate material coated with a cold mirror coating disposed at an opposite end of the entrance surface to receive said further transmitted light of said transmitted light beam, wherein the cold mirror coating transmits an infrared spectrum but reflects the visible spectrum such that the bottom curved surface behaves as a concave mirror to reflect the visible spectrum of said further transmitted light with positive optical power, resulting in a reflected light, wherein the resulting reflected light incident back on the 50% beamsplitter surface is deflected at a 90° angle, resulting in a deflected light;

an exit portal surface of the bulk substrate material coated with the hot mirror coating to receive and transmit the deflected light as a visible light, wherein said exit portal surface is disposed for human eye viewing of the visible light; and an exterior side surface of the bulk substrate material disposed at an opposite end of the exit portal surface of the bulk substrate material and coated with a broad-spectrum anti-reflection coating that transmits both visible and infrared spectra of a real world image incident on the exterior side surface such that the real world image that is transmitted is also viewable through the exit portal surface for human eye viewing, and such that of the real world image reflected by the 50% beamsplitter surface, an infrared spectrum of the real world image is reflected by the upper surface, partially transmitted back through the 50% beamsplitter surface, and transmitted through the bottom curved surface to be focused onto an infrared camera pixel array.

2. The dual-function optic of a bulk substrate material recited in claim 1, wherein the 50% beamsplitter surface is formed in the bulk substrate material at an angle of 45° with respect to the transmitted light beam.

3. The dual-function optic of a bulk substrate material recited in claim 1, wherein the bulk substrate material is based on glass.

4. The dual-function optic of a bulk substrate material recited in claim 1, wherein said hot mirror coating of said entrance surface is capable of transmitting a visible spectrum, generally with wavelengths between 0.45 and 0.75 microns, while reflecting an infrared spectrum, which includes wavelengths longer than 0.75 microns.

5. The dual-function optic of a bulk substrate material recited in claim 1, wherein said convex curvature of said entrance surface induces positive optical power.

6. The dual-function optic of a bulk substrate material recited in claim 1, wherein said 50% beamsplitter surface has a half-silvered coating cemented between two halves of the bulk substrate material to reflect roughly 50% of all wavelengths of light, including both visible and infrared, whereas light that is not reflected is transmitted.

7. The dual-function optic of a bulk substrate material recited in claim 1, wherein the cold mirror coating reflects a visible spectrum within the range of 0.45 to 0.75 microns, and transmits infrared wavelengths greater than 0.75 microns.

8. The dual-function optic of a bulk substrate material recited in claim 1, wherein a radius of curvature for the bottom curved surface collimates light.

9. The dual-function optic of a bulk substrate material recited in claim 1, wherein the exterior side surface of the bulk substrate material coated with a broad-spectrum anti-reflection coating is disposed opposite to the exit portal surface to enable a simultaneous human eye viewing from the exit portal surface of the visible light as a display image and the real world image as an augmented reality, wherein said infrared camera pixel array facing the bottom curved surface is disposed to form an infrared image through an air gap.

* * * * *